(12) United States Patent
Shiue

(10) Patent No.: US 8,539,612 B2
(45) Date of Patent: *Sep. 24, 2013

(54) WATER SPORTS GARMENT WITH STITCHLESS SEAMS

(75) Inventor: Min-Chen Shiue, Wujie Township, Yilan County (TW)

(73) Assignee: Shei Chung Hsin Ind. Co., Ltd., Yilan County (TW)

( * ) Notice: Subject to any disclaimer, the term of this patent is extended or adjusted under 35 U.S.C. 154(b) by 322 days.

This patent is subject to a terminal disclaimer.

(21) Appl. No.: 13/101,250

(22) Filed: May 5, 2011

(65) Prior Publication Data

US 2011/0265241 A1 Nov. 3, 2011

Related U.S. Application Data

(63) Continuation-in-part of application No. 12/799,707, filed on Apr. 30, 2010, now Pat. No. 8,393,012.

(51) Int. Cl.
*B63C 11/04* (2006.01)

(52) U.S. Cl.
USPC ............................................. 2/2.15

(58) Field of Classification Search
USPC .................. 2/2.15, 2.16, 69, 69.5, 81, 82
See application file for complete search history.

(56) References Cited

U.S. PATENT DOCUMENTS

| | | | | |
|---|---|---|---|---|
| 4,416,027 A | * | 11/1983 | Perla | 2/275 |
| 4,741,050 A | * | 5/1988 | O'Kane et al. | 112/413 |
| 4,915,046 A | * | 4/1990 | Meistrell | 112/419 |
| 6,415,449 B2 | * | 7/2002 | Duplock | 2/275 |
| 6,514,590 B1 | * | 2/2003 | Shih | 428/60 |
| 7,921,467 B2 | * | 4/2011 | Geidenmark | 2/2.15 |
| 8,393,012 B2 | * | 3/2013 | Shiue | 2/2.15 |

* cited by examiner

*Primary Examiner* — Tejash Patel
(74) *Attorney, Agent, or Firm* — McClure, Qualey & Rodack, LLP

(57) ABSTRACT

A water sports garment with stitchless seams and a fabrication method thereof is provided. The stitchless seams between waterproof sheets are joined and sealed by coating a liquid sealant solution.

16 Claims, 1 Drawing Sheet

WATER SPORTS GARMENT WITH STITCHLESS SEAMS

CROSS-REFERENCE TO RELATED APPLICATION

This application is a continuation-in-part of U.S. application Ser. No. 12/799,707, filed Apr. 30, 2010, the full disclosure of which is incorporated herein by reference.

BACKGROUND

1. Technical Field

The disclosure relates to water sports garment. More particularly, the disclosure relates to water sports garment with stitchless seams.

2. Description of Related Art

Waterproof wears are commonly used in water sports, such as diving, surfing and canoeing. The waterproof wears that are used in water sports must have the characteristics of lightweight, elasticity, buoyancy, being easy to put on and take off and tactual comfort of skin contact in order to allow the wearer to keep warm and to move without substantial constraints. The most commonly used material is foamed rubber.

Waterproof wears are made by joining separate waterproof sheets together. The joint is formed by sewing and/or adhesive bonding. The sewing operation causes waterproofness deficiency in long-term use of the waterproof wears, as well as irritation to the wearer's skin by repeated scratching.

Therefore, some water sports garment manufacturers have developed the process of using a sealant, tape, or liquid glue, to cover or replace the surface of the stitched rubber foam in order to overcome the defects caused by pinholes or sewing threads. But the sealant increases the thickness of the seam (glue plus threads plus sealant), and that impacts the aesthetic appearance. Moreover the sealant does not have high elasticity and thus decreases the stretchability of rubber foam sheets.

SUMMARY

In one aspect, the present invention is directed to a water sports garment with stitchless seams. The water sports garment comprises at least two waterproof sheets in contact with each other in butt splice manner to form a stitchless seam therebetween, and at least a waterproof strip covering the stitchless seam to join and seal the two waterproof sheets. The formulation of the waterproof strip comprises 100 parts by weight of a synthetic elastomer, 5-9 parts by weight of a vulcanizing agent, and 2.6-3.2 parts by weight of an antioxidant package.

In another aspect, the present invention is directed to a method of fabricating water sports garment. First, a liquid sealant solution having a viscosity of 200,000-500,000 cps is prepared. The formulation of the liquid sealant solution comprises 100 parts by weight of a synthetic elastomer, 5-9 parts by weight of a vulcanizing agent, 2.6-3.2 parts by weight of an antioxidant package, and solvents. Next, the liquid sealant solution is coated onto a stitchless seam between two waterproof sheets to form a waterproof strip. Then, the waterproof strip is vulcanized.

The foregoing presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

Many of the attendant features will be more readily appreciated as the same becomes better understood by reference to the following detailed description considered in connection with the accompanying drawings.

DETAILED DESCRIPTION

Figure 1A:
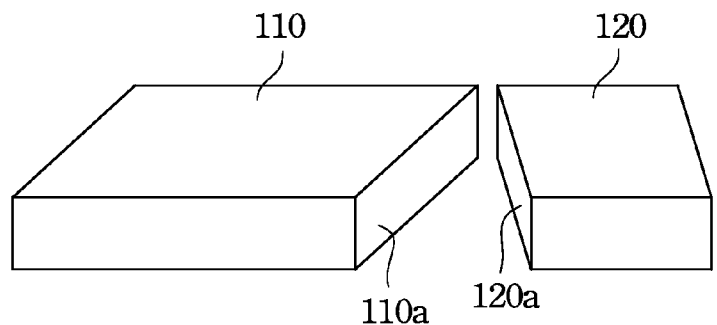
FIGS. 1A-1C are process diagrams of joining and sealing two waterproof sheets and forming a waterproof strip on the seam.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Preparation of Liquid Sealant Solution

In one aspect, this invention provides a formulation of a sealant solution for joining and sealing two waterproof sheets without stitching to fabricate water sports garment.

The formulation above comprises 100 parts by weight of a synthetic elastomer, 5-9 parts by weight of a vulcanizing agent, and 2.6-3.2 parts by weight of an antioxidant package. The synthetic elastomer can be polychloroprene, for example. The vulcanizing agent can be MgO, ZnO or a combination thereof, for example. The antioxidant package can be Nickel N,N-di-alkyl-aminodithiocarboxylate, 4,4'-bis(2,2-dimethylbenzyl) diphenylamine, or a combination thereof, for example. The parts by weight of the each component are listed in the Table 1 below.

TABLE 1

Composition of the liquid sealant formulation

| Composition of the Liquid Sealant Formulation | | Parts by weight |
|---|---|---|
| Synthetic elastomer | polychloroprene | 100 |
| Vulcanizing agent | MgO | 2-4 |
| | ZnO | 3-5 |
| Antioxidant | Nickel N,N-dialkyl-aminodithiocarboxylate | 0.4-0.8 |
| | 4,4'-bis(2,2-dimethylbenzyl) diphenylamine | 2.2-2.6 |

Then, a solvent, such as toluene, xylene, or a combination thereof, is added into the liquid sealant formulation above to form a liquid sealant solution. The viscosity of the liquid sealant solution is better to be 200,000-500,000 cps for better performance of the following sealing process.

Figure 1B:
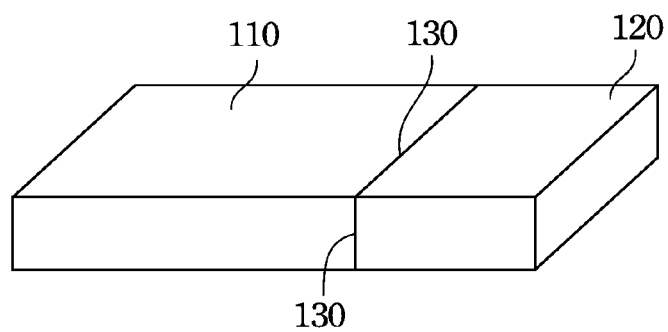
Figure 1C:
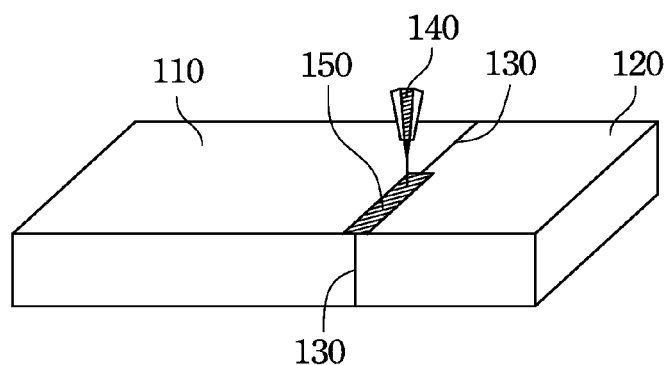

Joining and Sealing Method for Fabricating Water Sports Garment with Stitchless Seams In another aspect, this invention provides a joining and sealing method for fabricating water sports garment with stitchless seams. FIGS. 1A-1C are process diagrams of joining and sealing two waterproof sheets and forming a waterproof strip on the seam.

In FIGS. 1A-1B, a first joining surface 110a of a first waterproof sheet 110 and a second joining surface 120a of a second waterproof sheet 120 are put close together in a butt splice manner to form a seam 130 between the first waterproof sheet 110 and the second waterproof sheet 120. Each of the waterproof sheets 110 and 120 can be a foamed rubber sheet, or can be a foamed rubber sheet laminated to one fabric layer on one surface or two fabric layers on opposite surfaces.

Next in FIG. 1C, the liquid sealant solution 140 prepared above is applied onto the seam 130 to form a waterproof strip 150. Since the liquid sealant solution 140 can well penetrate into the seam 130, the waterproof strip 150 is not only formed on the surface of the seam 130 but also inside the seam 130 immediately between the first waterproof sheet 110 and the second waterproof sheet 120. To provide sufficient bonding strength to join two waterproof sheets, the coating width of the liquid sealant solution is better to be at least 3 mm, such as 3-15 mm, and the coating thickness is better to be at least 0.3 mm, such as 0.3-1.2 mm. Except the consideration above, there is no specific limitation for the coating width and thickness of the liquid sealant solution. The coating width and thickness of the liquid sealant solution depend on the requirements of the water sports garment.

Next, the joined and sealed structure is placed at high temperature for a period of time to vulcanize the elastomeric component in the waterproof strip 150. The temperature can be 80-150° C., such as 90-130° C. The heating time can be 5-60 minutes, such as 30-60 minutes. The waterproof strip 150 can be formed on an outer surface or/and an inner surface of a water sports garment.

Since the waterproof strip 150 is formed in and on the seam 130, the waterproof strip 150 can provide both high waterproofness and high bonding strength (>22.7 Kg/cm$^2$). Some experimental examples are disclosed below.

Experiment 1: Solvent Base Test

In this experiment, toluene and xylene were used as the solvent to form liquid sealant solutions. The amount used of the toluene was varied from 55 wt % to 0 wt %, and the amount used of the xylene was varied from 0 wt % to 55 wt %, as shown in Table 2. The solid contents of the liquid sealant solutions were all 45 wt %. The viscosity of the obtained liquid sealant solutions was in a range of 280,000-405,000 cps.

Figure 2:
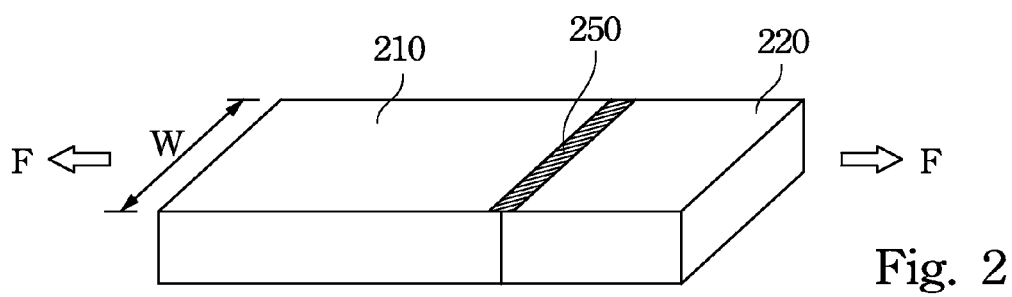
FIG. 2 is a diagram of a formed waterproof strip on a seam between two waterproof sheets and the directions of applied external forces in parallel bonding strength test.

FIG. 2 is a diagram of a formed waterproof strip on a seam between two waterproof sheets and the directions of applied external forces in parallel bonding strength test. In FIG. 2, two waterproof sheets 210 and 220, having a width (W) of 4 inches, were put close together in a butt splice manner and then coated with one of the liquid sealant solutions of Examples 1-5. The waterproof sheets used were a foamed elastomer sheet laminated to two fabric layers on opposite surfaces. On the first surface, the sealant width and the sealant thickness were all 5 mm and 0.6 mm, respectively for Examples 1-5. On the second surface, the sealant width and the sealant thickness were all 8 mm and 0.8 mm, respectively for Examples 1-5.

Then, the sealed structures of Examples 1-5 were vulcanized at 120° C. for 30 minutes. A parallel bonding strength test was performed for Examples 1-5, and the directions of the applied external forces (F) are shown in FIG. 2. The parallel bonding strength listed in Table 2 was the force per unit area that can separate the two waterproof sheets 210 and 220 in FIG. 2.

From Table 2, it can be known that the parallel bonding strength was in a range of 27.4-42.5 kg/cm$^2$, which is greater than 22.7 kg/cm$^2$ of the accepted parallel bonding strength for the wetsuits. From Table 2, it also can be known that the more amount of the xylene was used, the greater the parallel bonding strength was, when the solid content was 45 wt %.

TABLE 2

Solvent Base Test

| | Example | | | | |
|---|---|---|---|---|---|
| | 1 | 2 | 3 | 4 | 5 |
| Solid content (wt %) | 45 | 45 | 45 | 45 | 45 |
| Solvent (wt %) | Toluene(55) | Toluene(45) Xylene(10) | Toluene (35) Xylene(20) | Toluene(30) Xylene(25) | Xylene(55) |
| Viscosity (cps) | 280,000 | 310,000 | 340,000 | 370,000 | 405,000 |
| Vulcanizing temperature (° C.) | 120 | 120 | 120 | 120 | 120 |
| Vulcanizing time (minutes) | 30 | 30 | 30 | 30 | 30 |
| 4" Parallel bonding strength (kg/cm$^2$) | 27.4 | 33.9 | 37.2 | 40.6 | 42.5 |

Experiment 2: Solid Content Test

In this experiment, the solid content was varied for Examples 6-10 in a range of 40-60 wt %. The solvent used in this experiment was xylene. The viscosity of the obtained liquid sealant solutions was in a range of 384,000-510,000 cps.

Then, the sealant solutions of Examples 6-10 were respectively coated on samples of waterproof sheets 210 and 220 as shown in FIG. 2. The waterproof sheets used were a foamed elastomer sheet laminated to two fabric layers on opposite surfaces. On the first surface, the sealant width and the sealant thickness were all 5 mm and 0.6 mm, respectively for Examples 6-10. On the second surface, the sealant width and the sealant thickness were all 8 mm and 0.8 mm, respectively for Examples 6-10.

Next, the sealed structures of Examples 6-10 were vulcanized at 120° C. for 30 minutes. A parallel bonding strength test was performed for Examples 6-10, and the directions of the applied external forces (F) are shown in FIG. 2. The parallel bonding strength listed in Table 3 was the force per unit area that can separate the two waterproof sheets 210 and 220 in FIG. 2.

From Table 3, it can be known that the parallel bonding strength was in a range of 25.6-41 kg/cm$^2$, which is greater than 22.7 kg/cm$^2$ of the accepted parallel bonding strength for the wetsuits. From Table 3, it also can be known that the less the solid content was, the greater the parallel bonding strength was, when solid content was in the range of 40-60 wt %.

TABLE 3

Solid Content Test

| | Examples | | | | |
|---|---|---|---|---|---|
| | 6 | 7 | 8 | 9 | 10 |
| Solid content (wt %) | 40 | 45 | 50 | 55 | 60 |
| Xylene (wt %) | 60 | 55 | 50 | 45 | 40 |
| Viscosity (cps) | 384,000 | 405,000 | 430,000 | 475,000 | 510,000 |
| Vulcanizing temperature (° C.) | 120 | 120 | 120 | 120 | 120 |
| Vulcanizing time (minutes) | 30 | 30 | 30 | 30 | 30 |
| 4" Parallel bonding strength (kg/cm²) | 41 | 36.2 | 30.8 | 29.2 | 25.6 |

Experiment 3: Vulcanization Temperature Test

In this experiment, the vulcanizing temperature was varied for Examples 11-14 in a range of 120-150° C. The solid contents of Examples 11-14 were all 45 wt %, and the solvents used were all xylene. The viscosity of the obtained liquid sealant solutions was 405,000 cps.

Then, the sealant solutions of Examples 11-14 were respectively coated on samples of waterproof sheets 210 and 220 as shown in FIG. 2. Each of the waterproof sheets used were a foamed elastomer sheet laminated to two fabric layers on opposite surfaces. On the first surface, the sealant width and the sealant thickness were all 5 mm and 0.6 mm, respectively for Examples 11-14. On the second surface, the sealant width and the sealant thickness were all 8 mm and 0.8 mm, respectively for Examples 11-14.

Next, the sealed structures of Examples 11-14 were respectively vulcanized at 120-150° C. for 30 minutes. A parallel bonding strength test was performed for Examples 11-14, and the directions of the applied external forces (F) are shown in FIG. 2. The parallel bonding strength listed in Table 4 was the force per unit area that can separate the two waterproof sheets 210 and 220 in FIG. 2.

From Table 4, it can be known that the parallel bonding strength was in a range of 35.7-38.9 kg/cm², which is greater than 22.7 kg/cm² of the accepted parallel bonding strength for the wetsuits. From Table 4, it also can be known that the higher the vulcanizing temperature was, the greater the parallel bonding strength was, when the vulcanizing temperature in the range of 120-150° C.

TABLE 4

Vulcanizing Temperature Test

| | Examples | | | |
|---|---|---|---|---|
| | 11 | 12 | 13 | 14 |
| Solid content (wt %) | 45 | 45 | 45 | 45 |
| Xylene (wt %) | 55 | 55 | 55 | 55 |
| Viscosity (cps) | 405,000 | 405,000 | 405,000 | 405,000 |
| Vulcanizing temperature (° C.) | 120 | 130 | 140 | 150 |
| Vulcanizing time (minutes) | 30 | 30 | 30 | 30 |
| 4" Parallel bonding strength (kg/cm²) | 35.7 | 37.3 | 37.6 | 38.9 |

Experiment 4: Comparative Tests

In this experiment, some comparative tests for various reinforced processes for the seam between two waterproof sheets were performed.

The waterproof sheets having a foamed rubber sheet sandwiched by two nylon fabric layers were used in this comparative test. The thickness of the waterproof sheets was 3 mm. When the waterproof sheets were stretched to 160% of its original length, the needed external force was 1.3 kg. When an external force of 4.5 kg was applied to the waterproof sheets, the length of the waterproof sheets was increased by 175.0%.

Next, two waterproof sheets above were put close together in a butt splice manner, and the joining surfaces of the two waterproof sheets were glued by an adhesive to form a glued seam therebetween. The additional processes for bonding the two waterproof sheets together were listed in Table 5 for Examples 12-18, respectively.

In Example 15, no additional processes were performed on both surfaces of the seam between the two waterproof sheets, and the parallel bonding strength was only 15.3 kg/cm², which is smaller than 22.7 kg/cm² of the accepted parallel bonding strength for the wetsuits.

In Example 16, only one surface of the seam was stitched, the other surface is not processed further. Comparing with Examples 15, the parallel bonding strength was raised to 32.7 kg/cm², which was about two times that of Example 15.

In Example 17, one surface of the seam was further stitched, and the other surface of the seam was further reinforced by hot melt glue. Comparing with Example 16, the parallel bonding strength was further raised to 39.8 kg/cm².

In Example 18, both surfaces of the stitchless seam was further reinforced by coating the liquid sealant solution above, the sealant width was 4 mm on the first surface and 6 mm on the second surface. The parallel bonding strength was 36.7 kg/cm², which was almost the same as Example 17 above.

For the stretching test results, the tested results of Example 18 were poorer than that of Example 15. However, the tested results of Example 18 were better than those of Examples 16 and 17, which were reinforced by at least stitching one surface of the seam between waterproof sheets.

TABLE 5

Comparative Test

| | Additional process | | Stretching Test | | 4" parallel Bonding Strength (kg/cm²) |
|---|---|---|---|---|---|
| Examples | First surface | Second surface | Modulus 60% (kg) | Elongation at specified load (% 4.5 kg) | |
| 15 | — | — | 1.7 | 170.6% | 15.3 |
| 16 | stitched | — | 2.4 | 152.4% | 32.7 |
| 17 | stitched | Hot melt glue* | 2.8 | 121.3% | 39.8 |
| 18 | Sealant (4 mm) | Sealant (6 mm) | 2.1 | 158.9% | 36.7 |
| waterproof sheet** | — | — | 1.3 | 175.0% | — |

*The structure of the hot melt glue was a layer of cloth and a layer of hot melt glue thereon. The material of the cloth is usually nylon, polyester or polyurethane.
**The structure of the waterproof sheet is a foamed elastomer sheet laminated to two fabric layers on opposite surfaces Accordingly, the embodiments of this invention provide water sports garment with stitchless seams and a fabrication method thereof. It will thus be understood that the process provided by the embodiments above is intended to permit fabricating water sports garment, such as a wetsuit or wetsuit accessories without sewing or stitching with needles. Moreover, the waterproof strip covering the stitchless seams between two waterproof sheets can provide parallel bonding strength comparable with stitched seams between waterproof sheets, and provide higher elasticity comparing with stitched seams. Furthermore, since the seams were stitchless in the embodiments of this invention, the defects of leaking, breaking or discomfort caused by pinholes, thread breaking or unraveling from sewing or stitching can be solved.

The reader's attention is directed to all papers and documents which are filed concurrently with this specification and which are open to public inspection with this specification, and the contents of all such papers and documents are incorporated herein by reference.

References in the singular may also include the plural (for example, "a" and "an" may refer to one, or one or more) unless the context specifically states otherwise. The use of numerical values in the various ranges specified in this application, unless expressly indicated otherwise, are stated as approximations as though the minimum and maximum values within the stated ranges were both preceded by the word "about". In this manner, some variations above and below the stated ranges can be used to achieve substantially the same results as values within the ranges. Also, the disclosure of these ranges is intended as a continuous range including every value between the minimum and maximum values.

All the features disclosed in this specification (including any accompanying claims, abstract, and drawings) may be replaced by alternative features serving the same, equivalent or similar purpose, unless expressly stated otherwise. Thus, each feature disclosed is one example only of a generic series.

What is claimed is:

1. A water sports garment with stitchless seams, comprising: at least two waterproof sheets in contact with each other in a butt splice manner to form a stitchless seam therebetween; and at least a waterproof strip covering the stitchless seam to join and seal the two waterproof sheets, wherein the formulation of the waterproof strip comprises: 100 parts by weight of a synthetic elastomer; 5-9 parts by weight of a vulcanizing agent; and 2.6-3.2 parts by weight of an antioxidant package.

2. The water sports garment of claim 1, wherein the synthetic elastomer comprises polychloroprene.

3. The water sports garment of claim 1, wherein the vulcanizing agent is MgO, ZnO or a combination thereof.

4. The water sports garment of claim 1, wherein the antioxidant package can be Nickel N,N-di-alkyl-aminodithiocarboxylate, 4,4'-bis(2,2-dimethylbenzyl) diphenylamine, or a combination thereof.

5. The water sports garment of claim 1, wherein the waterproof sheets each is a foamed rubber sheet, or a foamed rubber layer laminated with one or two fabric layers.

6. The water sports garment of claim 1, wherein the width of the waterproof strip is 3-15 mm.

7. The water sports garment of claim 1, wherein the thickness of the waterproof strip is 0.3-1.2 mm.

8. A method of fabricating water sports garment, comprising: preparing a liquid sealant solution having a viscosity of 200,000-500,000 cps, wherein the formulation of the liquid sealant solution comprises: 100 parts by weight of a synthetic elastomer; 5-9 parts by weight of a vulcanizing agent; 2.6-3.2 parts by weight of an antioxidant package; and solvents; coating the liquid sealant solution onto a stitchless seam between two waterproof sheets to form a waterproof strip; and vulcanizing the waterproof strip.

9. The method of claim 8, wherein the synthetic elastomer comprises polychloroprene.

10. The method of claim 8, wherein the vulcanizing agent is MgO, ZnO or a combination thereof.

11. The method of claim 8, wherein the antioxidant package can be Nickel N,N-di-alkyl-aminodithiocarboxylate, 4,4'-bis(2,2-dimethylbenzyl) diphenylamine, or a combination thereof.

12. The method of claim 8, wherein the solvent is toluene, xylene, or a combination thereof.

13. The method of claim 8, wherein the vulcanizing temperature is 80-150.degree. C.

14. The method of claim 8, wherein the vulcanizing time is 5-60 minutes.

15. The method of claim 8, wherein the width of the waterproof strip is 3-15 mm.

16. The method of claim 8, wherein the thickness of the waterproof strip is 0.3-1.2 mm.

* * * * *